(12) United States Patent
Kupper

(10) Patent No.: US 8,876,226 B2
(45) Date of Patent: Nov. 4, 2014

(54) SEAL ASSEMBLY

(75) Inventor: David G. Kupper, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 399 days.

(21) Appl. No.: 13/313,184

(22) Filed: Dec. 7, 2011

(65) Prior Publication Data

US 2012/0161509 A1  Jun. 28, 2012

Related U.S. Application Data

(60) Provisional application No. 61/426,599, filed on Dec. 23, 2010.

(51) Int. Cl.
*B62D 55/00* (2006.01)
*B62D 55/088* (2006.01)

(52) U.S. Cl.
CPC ................. *B62D 55/0887* (2013.01)
USPC .......... 305/103; 305/106; 305/203; 277/637; 277/649

(58) Field of Classification Search
CPC ................................................. B62D 55/0887
USPC ......... 305/100, 103, 104, 105, 106, 200, 202, 305/203, 204; 277/630, 637, 644, 648, 649
See application file for complete search history.

(56) References Cited

U.S. PATENT DOCUMENTS

| | | | |
|---|---|---|---|
| 2,389,874 A | 11/1945 | Searles et al. | |
| 3,392,984 A | 7/1968 | Reinsma | |
| 3,409,336 A * | 11/1968 | Dadds | 305/118 |
| 3,522,962 A * | 8/1970 | Poker, Jr. et al. | 403/39 |
| 3,574,419 A * | 4/1971 | Hatch | 305/103 |
| 3,622,165 A | 11/1971 | Hatch | |
| 3,675,936 A * | 7/1972 | Hatch | 277/628 |
| 3,731,551 A * | 5/1973 | Nelson | 305/118 |
| 3,801,163 A | 4/1974 | Khuntia | |
| 3,958,836 A | 5/1976 | Brown et al. | |
| 4,076,333 A | 2/1978 | Baylor | |
| 4,089,531 A | 5/1978 | Roley et al. | |
| 4,275,890 A | 6/1981 | Reinsma | |
| 4,396,198 A | 8/1983 | Metzner et al. | |
| 4,457,521 A | 7/1984 | Morley | |
| 4,560,174 A | 12/1985 | Bisi | |
| 4,607,854 A | 8/1986 | Bissi et al. | |
| 4,688,805 A | 8/1987 | Crotti et al. | |
| 4,819,999 A | 4/1989 | Livesay et al. | |
| 5,380,016 A | 1/1995 | Reinsma et al. | |
| 6,406,029 B1 | 6/2002 | Kupper et al. | |

(Continued)

FOREIGN PATENT DOCUMENTS

| | | |
|---|---|---|
| DE | 3300288 C2 * | 2/1988 |
| EP | 0034685 | 9/1981 |
| EP | 0185336 | 6/1986 |
| GB | 1408517 | 10/1975 |

*Primary Examiner* — Kip T Kotter
(74) *Attorney, Agent, or Firm* — Finnegan, Henderson, Farabow, Garrett & Dunner LLP

(57) ABSTRACT

A seal assembly 10,110 for sealing between a first member 12,112 and a second member 14,114 of a joint, the first member 12,112 being able to pivot about an axis 60,160 of the joint relative to the second member 12,112, is disclosed. The seal assembly 10,110 includes an annular seal body 30,130 which has a sufficient axial dimension X,XX to span first and second seal cavities 20,120,22,122 of the first member 12,112 and second member 14,114 of a joint.

20 Claims, 2 Drawing Sheets

(56) References Cited

U.S. PATENT DOCUMENTS

| | | |
|---|---|---|
| 7,004,477 B2 * | 2/2006 | Sakata et al. .................. 277/612 |
| 7,597,410 B2 * | 10/2009 | Mulligan et al. ............. 305/103 |
| 8,113,597 B2 * | 2/2012 | Grenzi ......................... 305/104 |
| 2008/0231110 A1 | 9/2008 | Bonowetz et al. |
| 2010/0148572 A1 | 6/2010 | Vom Stein |

* cited by examiner

SEAL ASSEMBLY

RELATED APPLICATIONS

This application is based upon, claims priority to, and otherwise claims the benefit of U.S. Provisional Application No. 61/426,599 by David G. Kupper, filed Dec. 23, 2010, the contents of which are expressly incorporated herein by reference.

TECHNICAL FIELD

The present disclosure relates to seals. More particularly, the present disclosure relates to a seal assembly for sealing between two pivotable members. Such a seal assembly may be used for sealing a track joint in a track chain.

BACKGROUND

In recent years, attention has been given to sealing joints in moving vehicles, and more particularly to an apparatus for sealing a track joint in a track chain. For example, crawler tractors, such as a bulldozer, typically have a sprocket, an idler, a track chain and a number of track shoes attached to the track chain for propelling the tractor over the ground. During use of the crawler tractor the sprocket rotates and engages the track chain, thereby causing the track chain, along with the attached track shoes, to rotate around a path defined by the sprocket and the idler. The rotation of the track chain causes the track shoes to engage the ground, thereby propelling the crawler tractor over the ground to perform various work functions.

Track chains generally include a pair of parallel chains, with each parallel chain being made up of a series of entrained master links and track links. Some track chains may further include a series of pins and bushings interposed between and connected to the parallel chains. The bushings and the entrained track links cooperate to form a number of track joints which allow the necessary movement of the bushings relative to the track links during use of the track chain, for example when the track chain rotates about the sprocket and the idler. Track joints are typically equipped with a track seal assembly to keep out various corrosive and abrasive mixtures of water, dirt, sand, rock or other mineral or chemical elements to which the track chain is exposed during its use. The track seal assembly also functions to keep a lubricant within the track joint to facilitate the aforementioned relative movement of the bushings and the track links.

Metal-face seals such as DUO-CONE™ or HDDF (Heavy Duty, Dual Face) seals may be used in this application. Such seals generally comprise two metal sealing rings floating in position, two elastomeric load rings which exert uniform pressure to accurately position the metal rings and serve as the static seal between the housing and the seal ring.

The load rings also transmits the turning torque from the drive housing to the seal ring. Positive sealing contact should be provided regardless of assembly tolerance stack up, shaft deflection, axial endplay, eccentricity, or vibration. The elastomeric material is usually a silicone or nitrile rubber. Several such seals are required for each joint in common applications. For example, four such seals may be required per each track joint in track applications.

SUMMARY OF THE INVENTION

In one aspect, the present disclosure is directed to a seal assembly for sealing between a first member and a second member of a track joint, the first member being able to pivot about an axis of the joint relative to the second member, the first member having a first seal cavity and the second member having a second seal cavity wherein first and second seal cavities form a substantially contiguous combined seal cavity, the seal assembly comprising a resilient seal ring having an annular seal body, a first seal lip projecting from the annular seal body and a second seal lip projecting from the annular seal body. The annular seal body has an axial dimension sufficient to span the first and second seal cavities, and, in use, the first seal lip abuts a portion of a first sidewall of the first seal cavity and the second seal lip abuts a portion of a first sidewall of the second seal cavity.

BRIEF DESCRIPTION OF THE DRAWINGS

The accompanying drawings illustrate presently preferred exemplary embodiments of the disclosure, and together with the general description given above and the detailed description of the preferred embodiments given below, serve to explain, by way of example, the principles of the disclosure.

DETAILED DESCRIPTION

According to one embodiment, a seal assembly is provided having a first seal ring that is held stationary within a seal cavity. The seal cavity is formed from two seal cavities. The two seal cavities are each located on a first and second member making up the seal joint.

Figure 1:
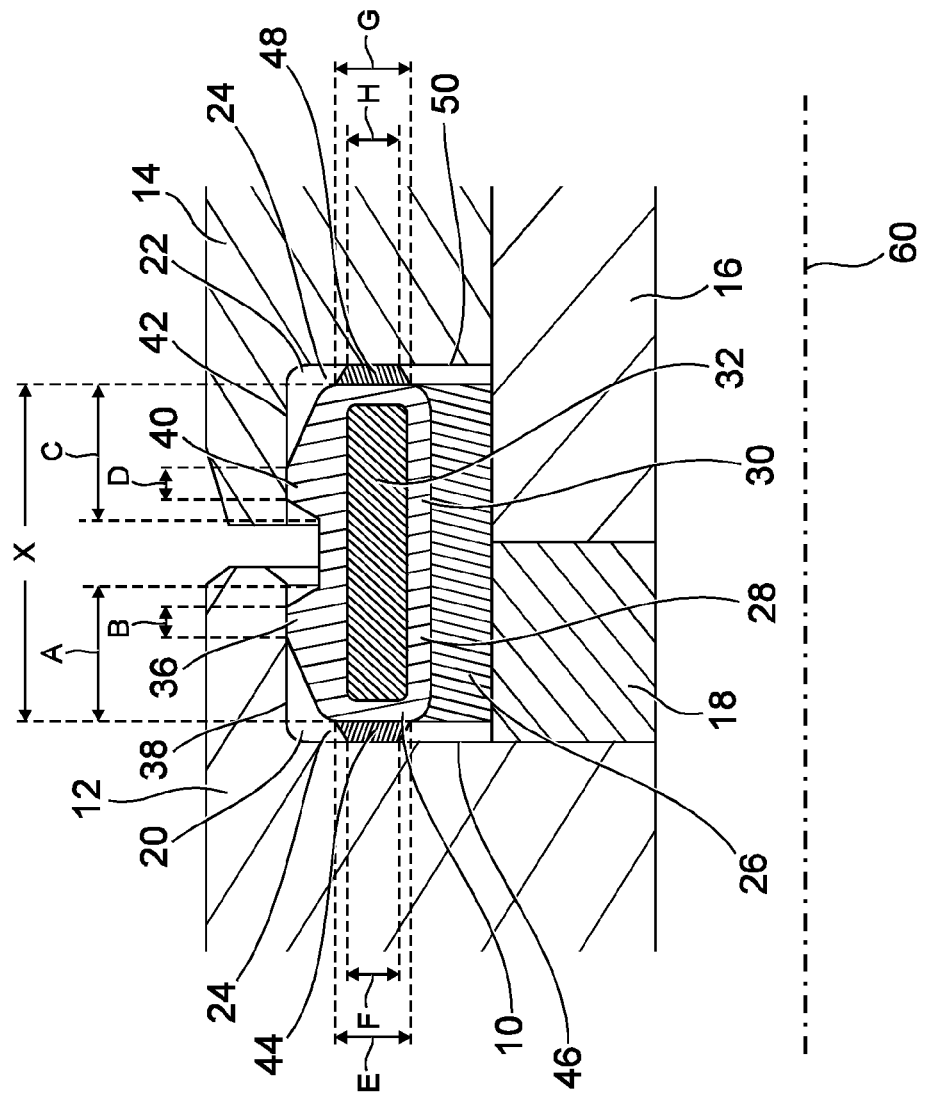
FIG. 1 is a diagrammatic illustration of a first embodiment of a seal assembly according to an exemplary embodiment of the present disclosure.

Turning to FIG. 1, a first embodiment of a seal assembly 10 is shown. The seal assembly 10 is provided for sealing between a first member 12 and a second member 14 of a joint. In this particular embodiment, the first member 12 is a collar of a track joint and the second member is the bushing of a track joint. The first member 12 is able to pivot about an axis 60 of the joint relative to the second member 14.

The second member 14 is located around a sleeve bearing 16. A thrust ring 18 is located between the first member 12 and the sleeve bearing 16.

The first member 12 has a first seal cavity 20 located adjacent the second member 14. The second member 14 has a second seal cavity 22 located adjacent the first member 12.

A combined seal cavity 24 is formed from the combination of the first seal cavity 20 and second seal cavity 22. The seal assembly 10 is located within the combined seal cavity 24.

The seal assembly 10 comprises a first seal ring 26 and a resilient seal ring 28. The first seal ring 26 is located around both the thrust ring 18 and the sleeve bearing 16.

The resilient seal ring 28 in this embodiment is formed from polyurethane. The resilient seal ring 28 comprises an annular seal body 30 moulded around an annular reinforcement ring 32. The annular reinforcement ring 32 has a substantially rectangular cross-section with chamfered corners. The annular reinforcement ring 32 is metal.

The annular seal body 30 has an axial dimension X sufficient to span the combined seal cavity 24.

A first seal lip 36 projects from the annular seal body 30. The first seal lip 36 projects radially outwardly from the annular seal body 30 and abuts an outer sidewall 38 of the first seal cavity 20. The outer sidewall 38 is the sidewall of the first seal cavity 20 furthest from the axis 60 of the joint.

A second seal lip 40 projects from the annular seal body 30. The second seal lip 40 projects radially outwardly from the annular seal body 30 and abuts an outer sidewall 42 of the second seal cavity 22. The outer sidewall 42 is the sidewall of the second seal cavity 22 furthest from the axis 60 of the joint.

A third seal lip 44 projects from the annular seal body 30. The third seal lip 44 projects axially away from the annular seal body 30 and abuts a second sidewall 46 of the first seal cavity 20. The second sidewall 46 of the first seal cavity 20 is substantially perpendicular to the outer sidewall 38 and to the axis 60 of the joint.

A fourth seal lip 48 projects from the annular seal body 30. The fourth seal lip 48 projects axially away from the annular seal body 30 and abuts a second sidewall 50 of the second seal cavity 22. The fourth seal lip 48 projects in an axially opposite direction to the third seal lip 44. The second sidewall 50 of the second seal cavity 22 is substantially perpendicular to the outer sidewall 42 and to the axis 60 of the joint.

The first and second seal lips 36,40 have substantially quadrilateral cross-sections. The quadrilateral cross-sections reduce in width from first widths A,C adjacent the annular seal body to second widths B,D at a distal end of the first and second seal lips 36,40.

The reduction in cross-sectional width from first widths A,C to second widths B,D is more acute on the axially outlying sides of the first and second seal lips 36,40 than on the axially inward sides.

The first widths A,C may typically be each around 25-49%, more preferably 35-45%, of the axial dimension X of the annular seal body 30.

The third seal lip 44 has a substantially quadrilateral cross-section, the quadrilateral cross-section reducing in width from a first width E adjacent the annular seal body 30 to a second width F at a distal end abutting the second sidewall 46 of the first seal cavity 20.

The fourth seal lip 48 has a substantially quadrilateral cross-section, the quadrilateral cross-section reducing in width from a first width G adjacent the annular seal body 30 to a second width H at a distal end abutting the second sidewall 50 of the second seal cavity 22.

The reduction in width of the quadrilateral cross-sections of the third seal lip 44 and fourth seal lip 48 are a more uniform taper than that of the first and second seal lips 36,40.

Figure 2:
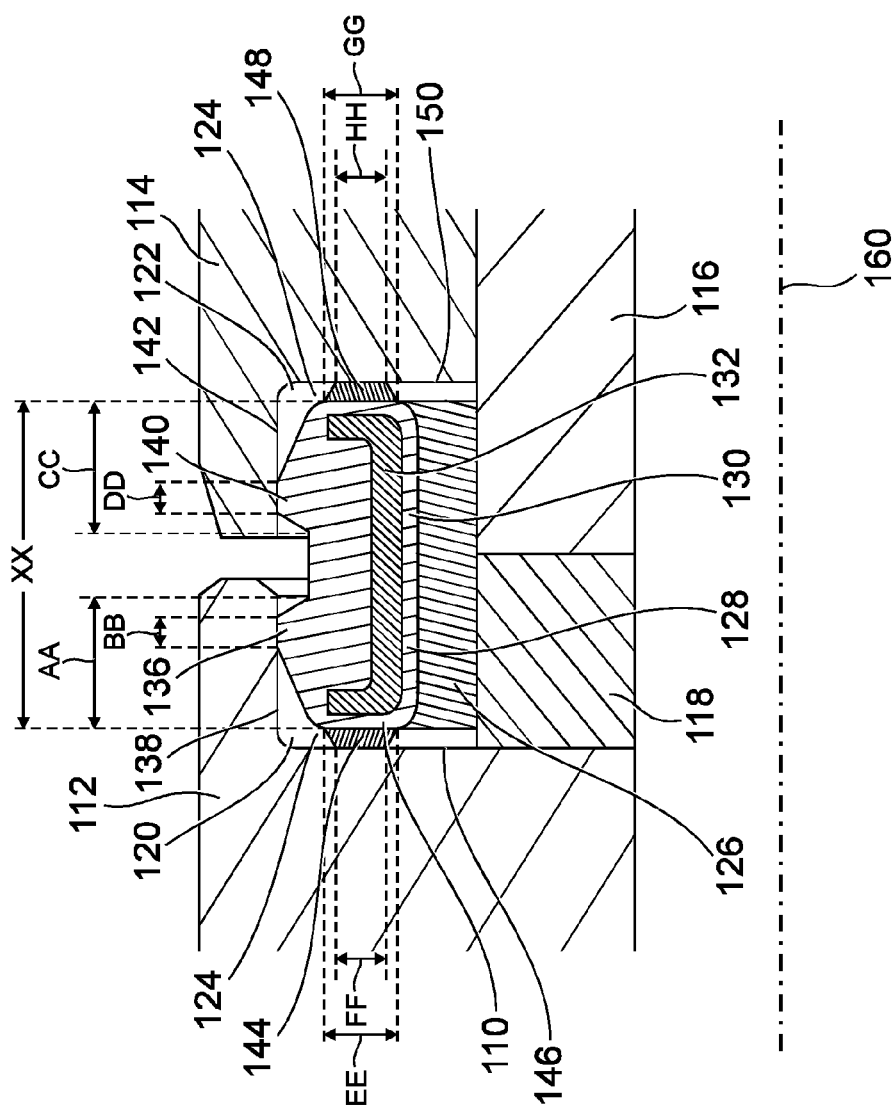
FIG. 2 is a diagrammatic illustration of a second embodiment of a seal assembly according to an exemplary embodiment of the present disclosure.

Turning to FIG. 2, a second embodiment of a seal assembly 110 is shown. The second embodiment is similar to the first embodiment, with features similar to those described in respect of the first embodiment being prefixed with a '1' if numerical or doubled if lettered e.g. 'XX' is equivalent to 'X'.

The second embodiment is largely identical to the first embodiment. The annular reinforcement ring 132 has a substantially U-shaped cross-section rather than being substantially rectangular. The U-shaped cross-section may provide greater reinforcement for less mass of material.

INDUSTRIAL APPLICABILITY

At least one embodiment of the disclosed seal assemblies may be used for a track pin. A track joint may comprise such a seal assembly. Any vehicle, such as a large wheel loader, may comprise such a seal assembly.

It may be possible to replace several prior art seal assemblies with a lesser number of at least one embodiment of the disclosed seal assemblies seal assemblies.

The seal assembly may accommodate radial and axial movement by a combination of the seal lips 36,40,44,48,136, 140,144,148 flexibility and compressibility.

At least one embodiment may keep costs for manufacturing and/or assembling a seal assembly within a track joint down. At least one embodiment may avoid cumbersome arrangements. The seal assembly may provide a simple assembling process of a track joint seal assembly.

It will be apparent to those skilled in the art that various modifications and variations can be made to the seal assembly. Other embodiments will be apparent to those skilled in the art from consideration of the specification and practice of the disclosed seal assembly. It is intended that the specification and examples be considered as exemplary only, with a true scope being indicated by the following claims and their equivalents.

One such modification may be the material used to form the annular seal body 30,130. Other plastics and thermoplastics materials, including urethane, may be used instead of polyurethane.

Annular reinforcement ring 32,132 may be omitted if a suitable material for the annular seal body 30,130 is selected.

The invention claimed is:

1. A seal assembly for sealing between a first member and a second member of a track joint, the first member being able to pivot about an axis of the track joint relative to the second member, the first member having a first seal cavity and the second member having a second seal cavity wherein the first and second seal cavities form a substantially contiguous combined seal cavity, the seal assembly comprising:
   a resilient seal ring having an annular seal body;
   a first seal lip projecting from the annular seal body;
   a second seal lip projecting from the annular seal body;
   wherein the annular seal body has an axial dimension sufficient to span the first and second seal cavities, and, in use, the first seal lip abuts a portion of a first sidewall of the first seal cavity and the second seal lip abuts a portion of a first sidewall of the second seal cavity, and
   wherein each of the first and second seal lips has a cross-section that reduces in width from a first width adjacent the annular seal body, to a second width at a distal end.

2. A seal assembly according to claim 1 wherein at least one of the first and second seal lips projects radially outward from the annular seal body.

3. A seal assembly according to claim 1 wherein the seal assembly includes a third seal lip projecting axially from the annular seal body.

4. A seal assembly according to claim 3 wherein the seal assembly includes a fourth seal lip projecting axially from the annular seal body at a distal location from the third seal lip.

5. A seal assembly according to claim 4 wherein the fourth seal lip has a substantially quadrilateral cross-section, the quadrilateral cross-section reducing in width from a first width adjacent the annular seal body, to a second width at a distal end.

6. A seal assembly according to claim 3 wherein the third seal lip has a substantially quadrilateral cross-section, the quadrilateral cross-section reducing in width from a first width adjacent the annular seal body, to a second width at a distal end.

7. A seal assembly according to claim 1 wherein at least one of the first and second seal lips has a substantially quadrilateral cross-section.

8. A seal assembly according to claim 1 wherein the reduction in width is more acute on the axially outlying side of the first or second seal lip than on the axially inward side.

9. A seal assembly according to claim 1 wherein the resilient seal ring comprises a resilient material with an annular reinforcement ring embedded within the annular seal body, an axial dimension the annular reinforcement ring being greater than half the axial dimension of the annular seal body.

10. A seal assembly according to claim 9 wherein the annular reinforcement ring is metal.

11. A seal assembly according to claim 9 wherein the annular reinforcement ring has a substantially U-shaped cross-section.

12. A seal assembly according to claim 9 wherein the resilient material comprises one out of the following group: urethane, thermoplastic, and polyurethane.

13. A track joint comprising the seal assembly according to claim 1.

14. A large wheel loader comprising the seal assembly according to claim 1.

15. The seal assembly of claim 1, wherein the first width of the first seal lip is greater than the first width of the second seal lip and the second width of the second seal lip is greater than the second width of the first seal lip.

16. The seal assembly of claim 1, wherein the annular seal body includes an outer surface defined between a first edge and a second edge and wherein an edge of the first width of the first seal lip coincides with the first edge and an edge of the first width of the second seal lip coincides with the second edge.

17. The seal assembly of claim 1, wherein a total of the first width of the first seal lip and the first width of the second seal lip is greater than half of the axial dimension of the annular seal body.

18. A seal assembly for sealing between a first member and a second member of a track joint, the first member being able to pivot about an axis of the joint relative to the second member, the first member having a first seal cavity and the second member having a second seal cavity wherein first and second seal cavities form a substantially contiguous combined seal cavity, the seal assembly comprising:

a resilient seal ring having an annular seal body;
a first seal lip projecting radially outwardly from the annular seal body;
a second seal lip projecting radially outwardly from the annular seal body;
a third seal lip projecting axially away from the annular seal body;
a fourth seal lip projecting axially away from the annular seal body; and
an annular reinforcement ring embedded within the annular seal body,
wherein:
the annular seal body has an axial dimension sufficient to span the first and second seal cavities,
the annular reinforcement ring has an axial dimension that is greater than half of the axial dimension of the annular seal body and,
in use, the first seal lip abuts a portion of a first sidewall of the first seal cavity, the second seal lip abuts a portion of a first sidewall of the second seal cavity, the third seal lip abuts a portion of a second sidewall of the first seal cavity, and the fourth seal lip abuts a portion of a second sidewall of the second seal cavity.

19. The seal assembly of claim 18, wherein each of the first, second, third, and fourth seal lips has a substantially quadrilateral cross-section, the quadrilateral cross-section reducing in width from a first width adjacent the annular seal body, to a second width at a distal end.

20. The seal assembly of claim 19, wherein the reductions in width of the quadrilateral cross-sections of the third and fourth seal lips create a more uniform taper than that of the first and second seal lips.

* * * * *

UNITED STATES PATENT AND TRADEMARK OFFICE
CERTIFICATE OF CORRECTION

PATENT NO. : 8,876,226 B2  
APPLICATION NO. : 13/313184  
DATED : November 4, 2014  
INVENTOR(S) : David G. Kupper Page 1 of 1

It is certified that error appears in the above-identified patent and that said Letters Patent is hereby corrected as shown below:

In the Claims:

Column 5, line 1, in Claim 9, delete "dimension the" and insert -- dimension of the --.

Signed and Sealed this  
Seventeenth Day of November, 2015

Michelle K. Lee  
*Director of the United States Patent and Trademark Office*